United States Patent

[11] 3,611,325

[72] Inventors Joseph W. Beloy
New Brighton;
Gordon R. Lane, White Bear Lake, both of Minn.

[21] Appl. No. 333
[22] Filed Jan. 2, 1970
[45] Patented Oct. 5, 1971
[73] Assignee Sperry Rand Corporation
New York, N.Y.

[54] METHOD OF REDUCING WORD LINE TO BIT LINE COUPLED NOISE IN A PLATED-WIRE MEMORY STACK

5 Claims, 3 Drawing Figs.

[52] U.S. Cl. .......... 340/174 LA, 340/174 TB, 340/174 DC
[51] Int. Cl. .......... G11c 5/08, G11c 7/02, G11c 11/14
[50] Field of Search .......... 340/174 M, 174 LA, 174 PW, 174 TB, 174 DC

[56] References Cited

UNITED STATES PATENTS

| | | | |
|---|---|---|---|
| 3,432,835 | 3/1969 | Foglia | 340/174 LA |
| 3,470,549 | 9/1969 | Lane | 340/174 DC |

*Primary Examiner*—Bernard Konick
*Assistant Examiner*—Steven B. Pokotilow
*Attorneys*—Thomas J. Nikolai, Kenneth T. Grace and John P. Dority ABSTRACT: A method of organizing the common mode signal path in a plated-wire bit-line memory stack involving forming the common mode (signal) node on the memory plane and coupling the common coupled ends of each group of ordered word lines to the common mode node by a group associated clamp diode and to a respectively associated diverter and coupling the open end of each like-ordered word line of each group to a like-ordered driver bus by a word line associated selection diode. The activation of one diverter and one driver selects one word line. The method involves utilizing a diverter that couples a bias current to the common coupled ends of the word lines of each group through the clamp diode which bias current is slightly larger than the driver selection current through the selection diode. When driver selection current is coupled through the selection diode a portion of the common mode bias current, equal to the selection current, is diverted to the activated driver's common mode node return path limiting the selected word line voltage excursion to the clamp diode's voltage drop. This small voltage swing of the selected word line, being limited to the clamp diode drop, during the selection sequence generates substantially reduced capacitive and inductive coupled noise signals in the readout bit lines, and, accordingly, substantially improves the signal-to-noise ratio.

INVENTORS
JOSEPH W. BELOY
GORDON R. LANE
BY Kenneth S. Grace
ATTORNEY

METHOD OF REDUCING WORD LINE TO BIT LINE COUPLED NOISE IN A PLATED-WIRE MEMORY STACK

BACKGROUND OF THE INVENTION

The present invention relates to the electronic data-processing field and in its preferred embodiment to an electrically alterable memory system for using electrical conductors plated with a thin-ferromagnetic-film layer as the memory elements. Such memory elements are well known for their principle advantage lying in their adaptability to mass, or batch, fabrication techniques which provide high volumetric efficiency, i.e., many binary digits or bits per cubic inch. An excellent background for such memory systems appears in the publication, "A 500-Nanosecond Main Computer Memory Utilizing Plated-Wire Elements," AFIPS, Conference Proceedings, Volume 29, 1966, FJCC, pages 305 – 314.

Plated-wire memory systems utilizing the magnetization of areas along a conductive wire plated by a thin-ferromagnetic-film layer may be operated in the well-known word-organized or bit-organized memory systems. The high volumetric efficiency achieved by such memory systems must necessarily bring the several areas of magnetization, each representing discrete bits of digital data, and their associated circuitry into closer proximity whereby there arises "noise" signals similar to those obtained in more conventional toroidal ferrite core arrays. With the plated-wire bit lines, which are normally established in a parallel, planar array, and enveloped by a plurality of word lines orthogonal thereto, there is provided the normal capacitive and inductive coupling between adjacent bit lines and word lines whereby memory selection currents may induce noise signals in the selected bit lines that are of such a magnitude to substantially block out the digital significance of the readout signal. An excellent background for such noise signal conditions appears in the publication "Cross-Talk and Reflections in High Speed Digital Systems," AFIPS, Conference Proceedings, Volume 27, Part I, 1965, FJCC, pages 511–525. Accordingly, several prior art techniques for the elimination of such deleterious noise signals have been incorporated in prior art plated-wire memory systems.

One prior art technique often utilized to eliminate, or reduce deleterious noise signals is the utilization of a dummy wire or line. In toroidal ferrite core arrays such dummy lines generally consist of a conductor running parallel to and associated with a particular output of sense line such that the dummy line and the output line are effected by substantially the noise signals whereby there is induced in such lines similar, common mode, noise signals. The dummy line and the output or sense line are coupled to a differential sense amplifier which cancels out the common mode noise signals leaving only the desired readout signals as an output therefrom. In plated-wire memory systems the dummy line usually consists of a bit line, similar to that of the other plated wires of the plated-wire array, which is coupled in parallel, by suitable gating means with a plurality of bit lines. The dummy line and the associated plurality of active bit lines are maintained in a substantially closely packed relationship whereby it is expected that common mode noise signals, which are induced in the dummy line, are equal to those that are induced in each of the associated active bit lines whereby the associated differential amplifier provides a signal substantially representative of the expected readout signal.

As the noise or common mode signals are generally due to radiated coupling, denoted as capacitive and inductive coupling, large loop areas established by substantially widely separated drive line, return line pairs can contribute undesirably large noise signals of different intensities whereby the differential sense amplifier is unable to eliminate all the deleterious noise. In the copending patent application U.S. Ser. No. 882,578 of T. W. Mack, et al., there is disclosed a plated-wire memory stack comprised of two superposed arrays, each array including two superposed planes. Each plane includes 180 parallel, coplanar bit lines and 256 parallel word lines enveloping and orthogonal to the inductively bit lines. The 180 bit lines are divided into 10 groups of 18 contiguous bit lines, each group including 16 magnetizable material plated active lines and two dummy lines. The superposed, like-ordered, e.g., odd-numbered, bit lines of the first, second, third, and fourth planes are intercoupled in a nontransposed manner. However, the superposed like-ordered, e.g., even-numbered, bit lines of the first and second planes and of the third and fourth planes are intercoupled in a nontransposed manner while the superposed, like-ordered, e.g., even-numbered, bit lines of the second and third planes are intercoupled in a transposed manner. This arrangement causes alternate numbered bit lines, i.e., the odd-numbered lines are alternate to and interposed between the even-numbered bit lines, because of the nontransposed and transposed intercoupling, to generate subtractive, opposite polarity, bit line output signal generated cross-talk noise signals in mutually adjacent bit lines.

SUMMARY OF THE PRESENT INVENTION

The present invention may be considered to be an improvement invention of the above discussed copending patent application, U.S. Ser. No. 882,578 of T. W. Mack, et al., and involves providing a common mode (signal path) node on each plane and adding clamping diodes electrically intermediate the common coupled ends of each group of word lines and the common mode node along with a diverter bias current for limiting word line voltage swing upon application of the driver selection current to the word line associated selection diodes.

DESCRIPTION OF THE PREFERRED EMBODIMENT

Figure 1:
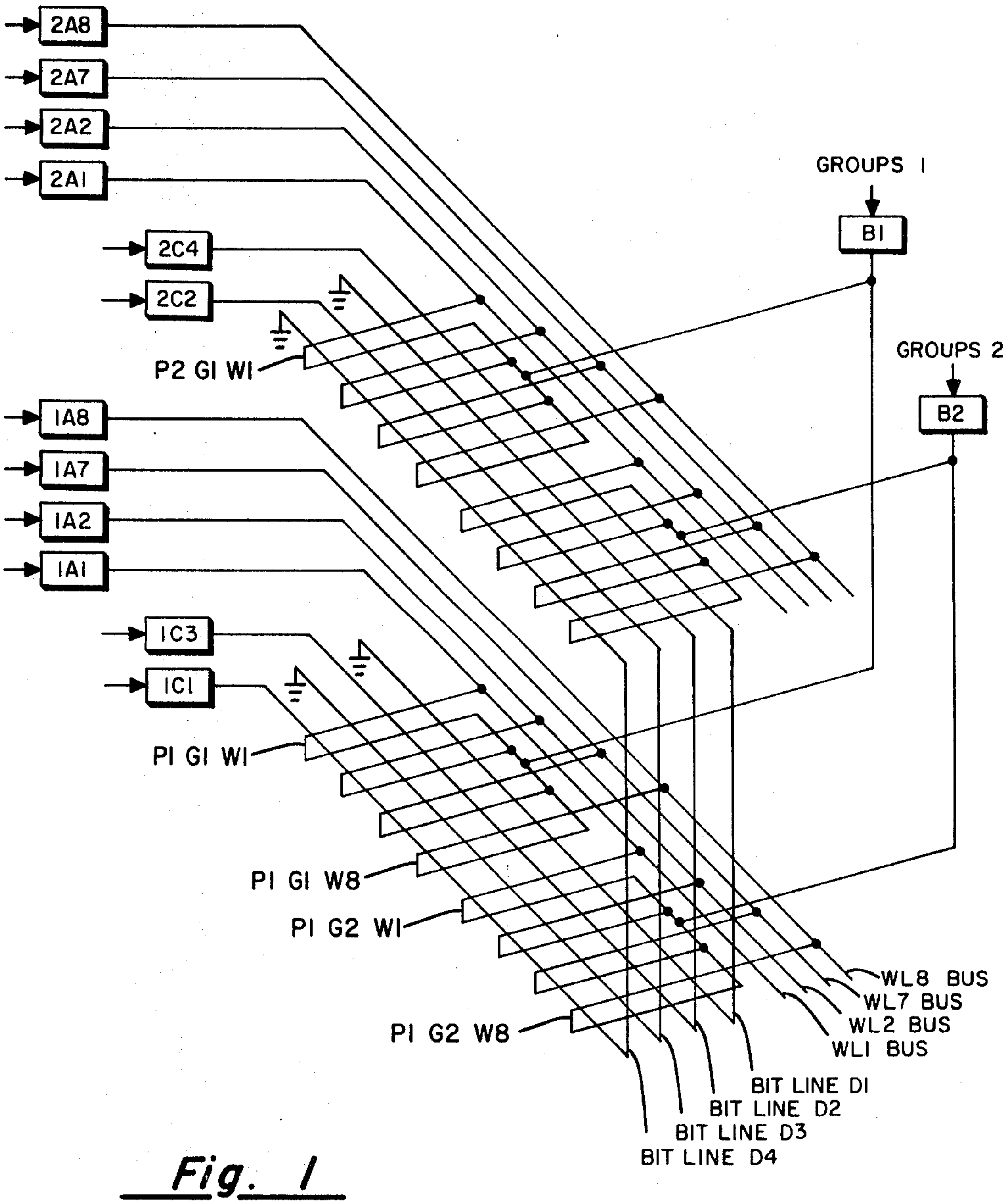
FIG. 1 is a diagrammatic illustration of the selection system of the plated-wire memory stack in which the present invention is incorporated.

With particular reference to FIG. 1 there is presented a diagrammatic illustration of the selection system of the plated-wire memory stack in which the present invention is incorporated. Illustrated in FIG. 1 is a generalized bit line, word line selection scheme for two plated-wire bit-line planes with two groups of four common coupled word lines per plane and four alternately coupled, or transposed, bit lines passing through the word lines of both planes. Selection of one word line e.g., word line P1G1W1, consists of first activating group 1 selector B1 which selects group G1 of planes P1 and P2. Next, plane 1, word line 1 selector 1A1 is activated whereby a continuous electrical path is provided through word line selector 1A1 and group selector B1 causing a word line selection current to flow through word line P1G1W1, i.e., word 1 (W1) of group 1 (G1) of plane 1 (P1).

In the actual array in which the present invention is incorporated, the array schematically illustrated in FIG. 1 consists of two planes (P1, P2) interconnected in the bit dimension by 180 alternately transposed/nontransposed bit lines (D1, D2/D1, D3). Each plane P1, P2 includes 256 word lines that envelope and are orthogonal to the inductively coupled bit lines. The 256 word lines of each plane are divided into 32 groups of eight word lines each while the 180 bit lines of the planes are divided into 10 groups of 18 bit lines each forming 10-bit words along the associated word line. Due to the physical compactness and electrical organization of the transposed bit line array, a word line selection current generated voltage component is capacitively coupled to the inductively associated bit lines at the bit line, word line cross points, e.g., as where bit lines D1, D2, D3, D4 of plane P1 cross word line P1G1W1. The present invention is directed toward a method of substantially reducing this word line selection current induced bit line noise and involves the external X-sink selection circuitry associated with each group of word lines, e.g., groups G1 of planes P1, P2 and the group selection circuitry B1 of the groups G1. This method includes clamping the voltage excursion of the selected word line group to a diode drop which small word line voltage swing induces a substantially reduced capacitively coupled cross point noise signal in the associated bit lines.

Figure 2:
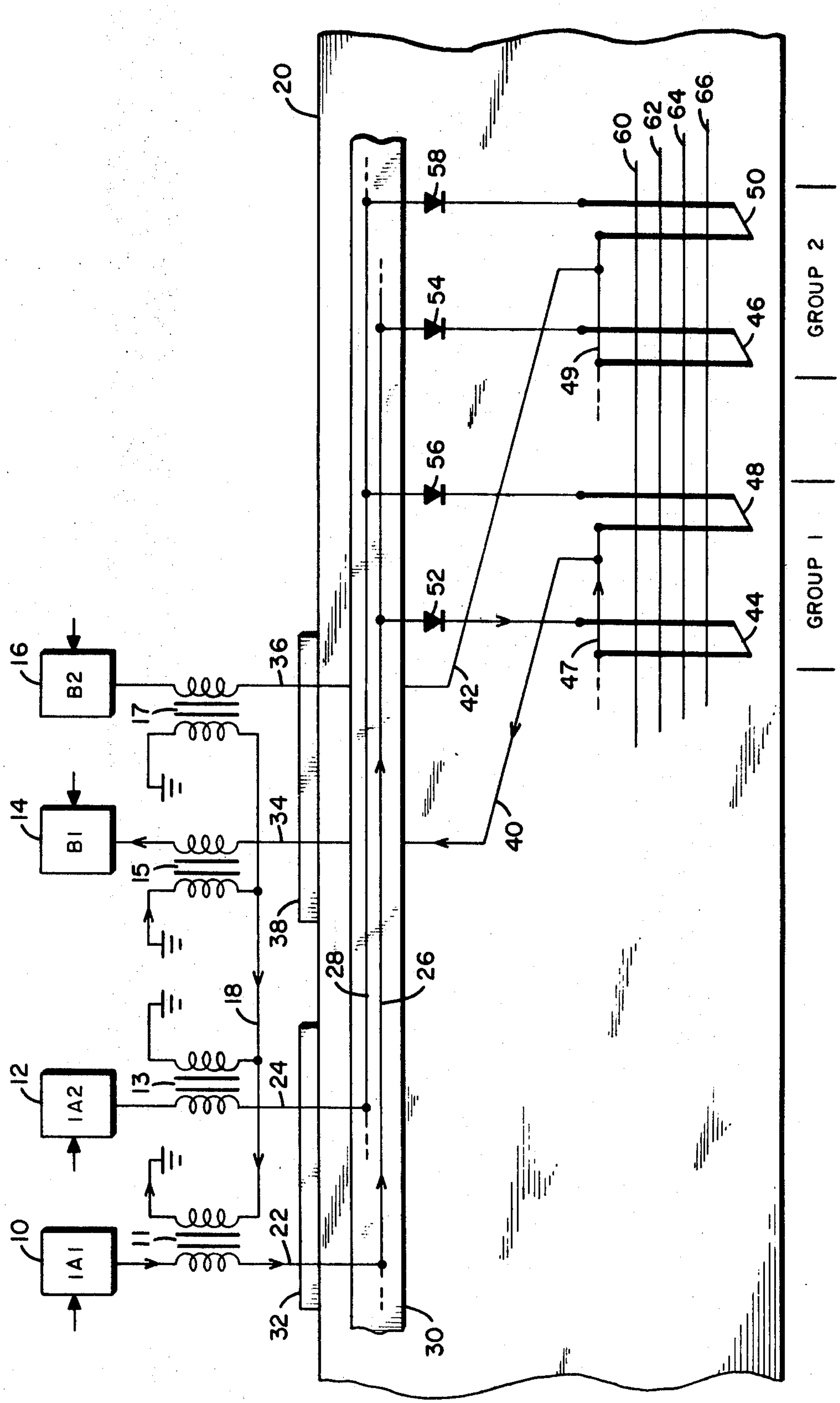
Fig. 2 (PRIOR ART)
FIG. 2 is a schematic illustration of the selection system of FIG. 1 illustrating the prior art common mode signal and selection signal paths.

With particular reference to FIG. 2 there is presented a schematic illustration of the selection system of FIG. 1 illustrating the prior art common mode signal, selection signal paths. For ease of discussion, only two word line drivers 10, 12 and two word line diverters 14, 16 are illustrated. The identifying nomenclature, e.g., 1A1 of word driver 10, is retained to illustrate the analogy to the selection system of FIG. 1. Drivers 10, 12 and diverters 14, 16 are illustrated as having associated common mode chokes 11, 13, and 15, 17, respectively, and a common mode signal path 18 which is external to plane 20 which may be considered to be analogous to plane P1 of FIG. 1. Each of the drivers 10, 12 through their associated signal lines 22, 24, respectively, are coupled to respectively associated driver buses 26, 28 of bus 30 through a connector 32. Diverters 14, 16 through their signal lines 34, 36 and connector 38 are coupled by their respectively associated printed circuit type signal lines 40, 42 to the common coupled ends of the word lines of group 1, group 2, respectively, and are thence capacitively and inductively coupled to the associated bit lines 60, 62, 64, 66. Finally, the like-ordered word line of each group, word lines 44 and 46 of group 1 and group 2, respectively, and like-ordered word lines 48 and 50 of group 1 and group 2, respectively, are coupled to the like-ordered driver bus 26 and 28, respectively, by the respectively associated selection diodes 52 and 54 and 56 and 58, respectively.

In this configuration, for the selection of a single word line, e.g., word line 44 of group 1, the activation of diverter 14 through line 40 and the common coupled end 47 of the word lines 44, 48 of group 1 effectively grounds the common coupled end of line 44. Next, driver 10 is activated whereby through its line 22 and associated bus 26 a positive driver selection signal is coupled to the anode of selection diode 52 causing a positive driver selection current signal to flow through the selected word line 44 and diverter 14. Common mode signal cancellation may be considered to be similar to that of the G. R. Lane U.S. Pat No. 3,470,549.

Figure 3:
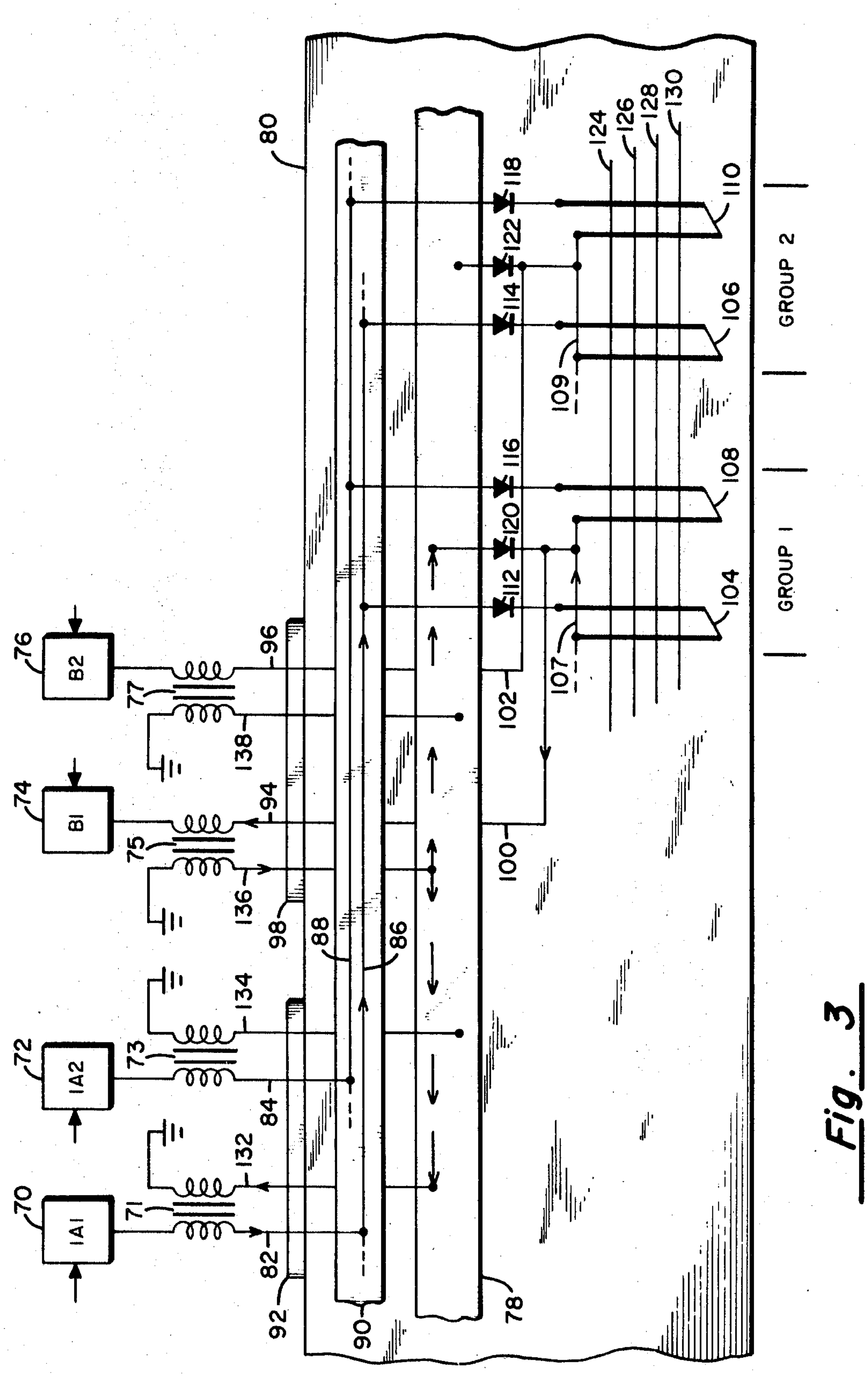
FIG. 3 is a schematic illustration of the selection system of FIG. 1 illustrating the novel common mode signal and selection signal paths.

With particular reference to FIG. 3 there is presented a schematic illustration of the selection system of FIG. 1 illustrating the novel common mode signal and selection signal paths utilized by the method of the present invention. As with respects to FIG. 2 and for ease in aiding a comparison thereto, only two word line drivers 70, 72 and diverters 74, 76 are illustrated as having associated common mode chokes 71, 73 and 75, 77, respectively, and a common mode node signal path 78 which is internal to plane 80 which may be considered to be analogous to plane P1 of FIG. 1. Each of the drivers 70, 72 through their associated signal lines 82, 84, respectively, are coupled to respectively associated driver buses 86, 88 of bus 90 through a connector 92. Diverters 74, 76 through their signal lines 94, 96 and connector 98 are coupled by their respectively associated printed circuit type signal lines 100, 102 to the common coupled ends 107, 109 of the word lines of group 1, group 2, respectively, and are thence capacitively and inductively coupled to the associated bit lines 124, 126, 128, 130. The like-ordered word line of each group, word line 104 and word line 106 of group 1 and group 2, respectively, and like-ordered word line 108 and word line 110 of group 1 and group 2, respectively, are coupled to the like-ordered driver bus 86 and 88, respectively, by the respectively associated selection diodes 112 and 114 and 116 and 118, respectively. Finally, the common coupled ends 107 and 109 of group 1 and group 2, respectively, are coupled to the common mode node 78 by respectively associated clamp diodes 120 and 122, respectively. The common mode signal lines 132 and 134 of drivers 70 and 72 and common mode signal lines 136 and 138 of diverters 74 and 76, respectively, are coupled to common mode node 78 which is internal to plane 80 to complete the common mode signal path.

In this configuration, for the selection of a single word line, e.g., word line 104 of group 1, diverter 74 is activated coupling a diverter selection current signal through line 100 to the common coupled end 107 of the word lines of group 1. Clamp diode 120 is then forward biased allowing a bias current to flow from common mode line 132, common mode node 78, signal line 100 and signal line 94. Selection diodes 112, 116 are now reversed biased and effectively block current flow therethrough. Next, driver 70 is activated whereby through line 82 and associated bus 86 a positive driver selection current signal, whose amplitude is approximately 90 percent of the diverter selection current signal, is coupled to the anode of selection diode 112. This combination of driver selection signal and diverter selection signal forward biases selection diode 116 whereby the voltage swing of the common coupled end 107 of the word lines of group 1, from the partially selected, i.e., the biased condition caused by the activated diverter, to the selected state, is limited to the voltage drop across clamping diode 120. Selection diode 112 passes the full driver selection current signal from bus 86 while clamp diode 120 diverts from the common mode node 78 the common mode signal that exceeds the driver selection signal. Thus, the diverter common mode signal from line 136 is caused to split into two components: a first component that flows through common mode node 78 into driver 70 common mode line 132; and, a second component that flows through common mode node 78 into clamp diode 120.

What we claim:

1. In a plated-wire memory stack comprising at least one plane, each plane including a plurality of parallel ordered bit lines and a plurality of parallel ordered word lines orthogonal to and inductively coupled to the bit lines, the word lines arranged in groups, all the word lines of each group common coupled on one end to a diverter and the like-ordered word line of each group coupled on the other end to a driver whereby the activation of one diverter and one driver selects one word line inducing in the associated bit lines signals representative of the bits of the associated word, the method of reducing word line to bit line coupled noise comprising:

forming a common mode node on said plane;

forming a plurality of driver coupled selection buses on said plane, each bus associated with a separate associated driver;

coupling the common coupled ends of the word lines of each group to said common mode node by a respectively associated group clamp diode; and, coupling the uncoupled ends of the like-ordered word line of each group to the respectively associated driver selection bus by a respectively associated line diode.

2. The method of claim 1 wherein each of said diverters and said drivers is, intermediate said plane, coupled to a common mode choke, and further including:

coupling each of said common mode chokes, by a separately associated common mode line, to said common mode node on said plane.

3. The method of claim 2 further including:

forming said common mode node as a printed circuit member.

4. The method of claim 3 further including:

forming said common mode node as a long narrow member; and orienting said common mode node substantially parallel to said driver selection buses.

5. In a plated-wire memory stack comprising at least one plane, each plane including a plurality of parallel ordered bit lines and a plurality of parallel ordered word lines orthogonal to and inductively coupled to the bit lines, the word lines arranged in groups, all the word lines of each group common coupled on one end to a diverter and the like-ordered word line of each group of word lines coupled on the other end to a driver whereby the activation of one diverter and one driver selects one word line inducing in the associated bit lines signals that are representative of the bits of the associated word, the method of reducing word line to bit line coupled noise comprising:

forming a common mode node on said plane;

forming a plurality of driver coupled selection buses on said plane;

coupling the common mode signal line of the drivers and of the diverters to said common mode node;

coupling the selection signal line of each driver to a separate associated one of said buses;

coupling the common coupled ends of the word lines of each group of word lines to said common mode node by a respectively associated separate clamp diode;

coupling the uncoupled ends of the like-ordered word line of each group of word lines to the respectively associated bus by a respectively associated separate selection diode;

coupling the selection signal line of each diverter to the common coupled ends of a separate associated one of said groups of word lines;

activating a selected one of said diverters;

coupling a diverter selection signal to the common coupled ends of the group of word lines that is associated with said selected diverter;

activating a selected one of said drivers;

coupling a driver selection signal to the bus that is associated with said selected driver;

forward biasing the clamp diode that is associated with said selected diverter;

inducing in said selected diverter common mode signal line a common mode signal that is substantially equal to said diverter selection signal;

diverting that portion of the diverter common mode signal that exceeds said driver selection signal through said common mode node and into said selected driver's common mode signal line;

activating a selected one of said drivers;

coupling a driver selection signal to the bus that is associated with said selected driver;

diverting a portion of the selection signals, equal in amplitude to the driver selection signal amplitude, through said common mode node to the common mode signal line of the selected driver.